(12) United States Patent
Roberts et al.

(10) Patent No.: US 6,509,139 B1
(45) Date of Patent: Jan. 21, 2003

(54) METHOD OF FABRICATING AN INTEGRATED OPTICAL COMPONENT

(75) Inventors: Stephen William Roberts, Winchester (GB); John Paul Drake, Lambourn (GB); Arnold Peter Roscoe Harpin, Abingdon (GB)

(73) Assignee: Bookham Technology PLC, Oxfordshire (GB)

( * ) Notice: Subject to any disclaimer, the term of this patent is extended or adjusted under 35 U.S.C. 154(b) by 29 days.

(21) Appl. No.: 09/686,906

(22) Filed: Oct. 12, 2000

(30) Foreign Application Priority Data

Oct. 13, 1999 (GB) .............................................. 9924098

(51) Int. Cl.⁷ ............................ G02B 6/10; H01L 21/00
(52) U.S. Cl. ...................... 430/321; 430/320; 430/322; 430/324; 430/313; 430/317; 430/330; 438/31; 438/32; 438/29; 438/44; 385/14; 385/131
(58) Field of Search ................................ 430/313–317, 430/320–330; 438/29–44; 385/14–131

(56) References Cited

U.S. PATENT DOCUMENTS 5,841,931 A * 11/1998 Foresi et al. ................. 385/131

6,316,281 B1 * 11/2001 Lee et al. ..................... 385/14

FOREIGN PATENT DOCUMENTS

GB          2345980 B  *  8/2001  ............ G02B/6/10

* cited by examiner

*Primary Examiner*—Mark F. Huff
*Assistant Examiner*—Daborah Chacko-Davis
(74) *Attorney, Agent, or Firm*—Fleshner & Kim, LLP

(57) ABSTRACT

A method of fabricating an integrated optical component on a silicon-on insulator chip comprising a silicon layer (1) separated from a substrate (2) by an insulating layer (3), the component having a first set of features, eg a rib waveguide (5) at a first level in the silicon layer (1) adjacent the insulating layer (3) and a second set of features, eg a triangular section (5B) at a second level in the silicon layer (1) further from the insulating layer (3), the method comprising the steps of:

selecting a silicon-on-insulator chip having a silicon layer (1) of sufficient thickness for the first set of features;

fabricating the first set of features in the silicon layer (1) at a first level in the silicon layer;

increasing the thickness of the silicon layer (1) in selected areas to form a second level of the silicon layer (1) over part of the first level; and then fabricating the second set of features at the second level in the silicon layer (1).

15 Claims, 7 Drawing Sheets

METHOD OF FABRICATING AN INTEGRATED OPTICAL COMPONENT

TECHNICAL FIELD

This invention relates to a method of fabricating an integrated optical component on a silicon-on-insulator (SOI) chip comprising a layer of silicon separated from a substrate by an insulating layer, the component having a first set of features at a first level in the silicon layer and a second set of features at a second level in the silicon layer. The invention also relates to an optical component obtainable by the method.

BACKGROUND ART

Integrated optical components may be fabricated in the silicon layer of an SOI chip. The silicon layer is typically up to 5 microns thick (but, in some cases, may be up to 10 microns thick) and features are defined therein by photolithographic techniques. Such optical components need to be fabricated with a high degree of accuracy to enable them to function correctly and known fabrication methods produce satisfactory yields for components formed on such chips.

In some cases, however, e.g. where a low loss optical connection is required between an integrated optical component and an optical fibre, there is a need to increase the thickness of the silicon layer, e.g. up to 13 microns or higher. If the SOI chip is initially fabricated with a silicon-layer of lower thickness, the thickness of the layer can be increased e.g. by epitaxial growth. Problems are, however, encountered in fabricating optical components in such thick silicon layers with sufficient accuracy, particularly when two stages of photolithography are required to form features at two different levels in the silicon layer. There are two principal reasons for the problem. Firstly, the thickness of the silicon layer of an SOI chip is not uniform and the thicker the layer, the greater the variations. Secondly, the accuracy with which a feature, particularly a depth dimension, can be etched, decreases with the thickness of the silicon layer, i.e. the deeper the etch the greater the variation in its dimensions. These two sources of inaccuracy tend to be accumulative. The problems become worse as the depth of the silicon layer and hence the depth of the features to be fabricated therein increase. This results in a gradual reduction in yield as thicker silicon layers are used and it has been found that the yield may fall to an unacceptably low level for components fabricated in a silicon layer having a thickness of 10 microns or more.

The invention aims to provide an improved method of fabricating integrated optical components which increases the yield in such circumstances.

DISCLOSURE OF INVENTION

According to a first aspect of the invention there is provided a method of fabricating an integrated optical component on a silicon-on-insulator chip comprising a silicon layer separated from a substrate by an insulating layer, the component having a first set of features at a first level in the silicon layer adjacent the insulating layer and a second set of features at a second level in the silicon layer further from the insulating layer, the method comprising the steps of:

selecting a silicon-on-insulator chip having a silicon layer of sufficient thickness for the first set of features;

fabricating the first set of features in the silicon layer so as to form said first set of features at a first level in the silicon layer;

increasing the thickness of the silicon layer in selected areas so as to form a second level of the silicon layer over at least part of the first level; and fabricating the second set of features at the second level in the silicon layer.

Accordingly to a further aspect of the invention there is provided an integrated optical component obtainable by such a method.

According to another aspect of the invention there is provided an integrated optical component on a silicon-on-insulator chip comprising a silicon layer separated from a substrate by an insulating layer comprising a first set of features at a first level in the silicon layer adjacent the insulating layer and a second set of features at a second level in the silicon layer further from the insulating layer, wherein the thickness of the silicon layer is 10 microns or more and the depth dimensions of the first set of features are formed to an accuracy of ±1.5%.

According to yet another aspect of the invention there is provided an integrated optical component on a silicon-on-insulator chip comprising a silicon layer separated from a substrate by an insulating layer, the component comprising a rib waveguide formed in the silicon layer so as to overhang an inclined end face of a V-groove formed in the chip, the end of the waveguide comprising a tapered structure in the form of a triangular shaped portion on top of the rib waveguide and comprising a widened portion in the form of a T-bar at the wide end of said tapered structure.

Preferred and optional features will be apparent from the following descriptions and from the subsidiary claims of the specification.

BRIEF DESCRIPTION OF DRAWINGS

The invention will now be further described, merely by way of example, with reference to the accompanying drawings, in which.

BEST MODE OF CARRYING OUT THE INVENTION

Figure 1A:
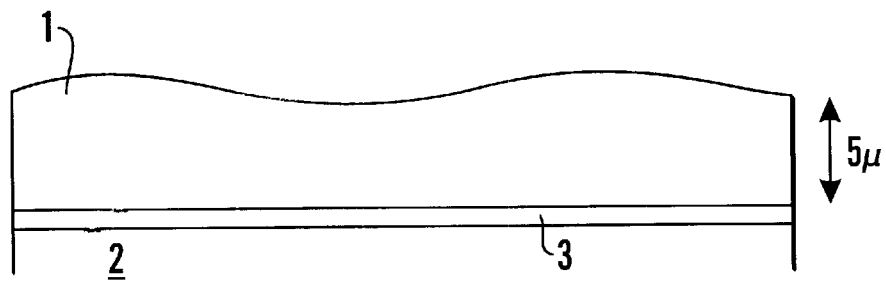
FIGS. 1A, 1B and 1C illustrate sources in inaccuracy of the fabrication of integrated optical circuits.
Figure 1B:
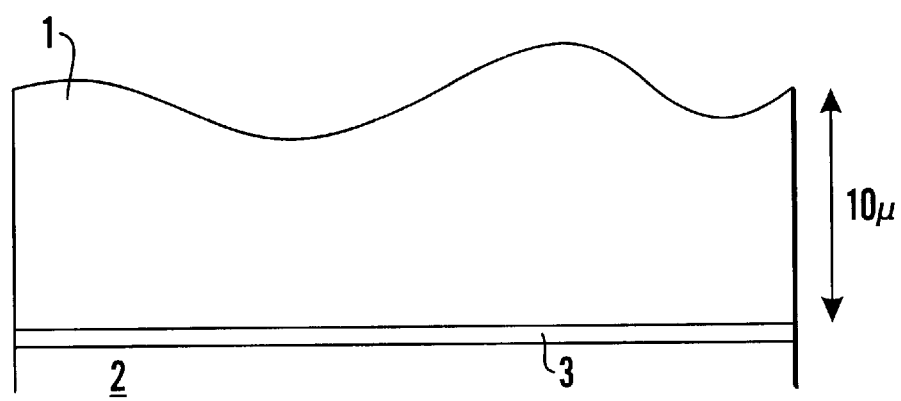
Figure 1C:
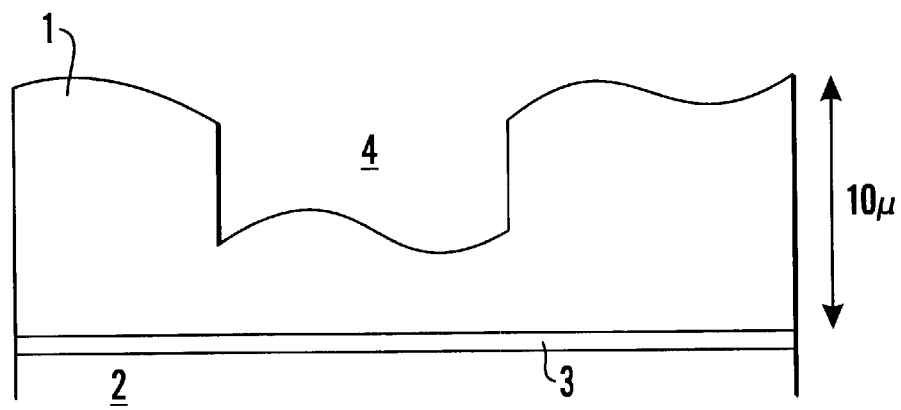

FIGS. 1A, 1B and 1C are schematic diagrams of a cross-section through a silicon-on-insulator (SOI) chip comprising a silicon layer 1 separated from a substrate 2, typically also of silicon, by an insulating layer 3, typically of silicon dioxide.

FIG. 1A shows variations (shown exaggerated) in the thickness of the silicon layer which is nominally 5 microns thick, Such variations may be in the order of ±5%, i.e. around ±0.25 microns for a 5 mm thick silicon layer.

FIG. 1B shows variations (again, shown exaggerated) in the thickness of a silicon layer which is nominally 10 microns in thickness. Again, the thickness of the layer is subject to variations of ±5%. i.e. around ±0.5 microns for a 10 micron thick silicon layer.

FIG. 1C shows a recess etched in the silicon layer. The depth of the recess can only be controlled to an accuracy of ±5%, particularly for etch depths greater than 5 microns, resulting in variations of the etch depth of ±0.25 microns or more.

These sources of error are accumulative so the overall variation in the etch depth, and thus the thickness of the silicon layer remaining at the base of the recess in FIG. 1C, can vary by up to ±0.75 microns. Such a level of variation may be unacceptable in mass produced components as a high proportion of components have to be rejected as they are not formed within the required tolerance.

Figure 2A:
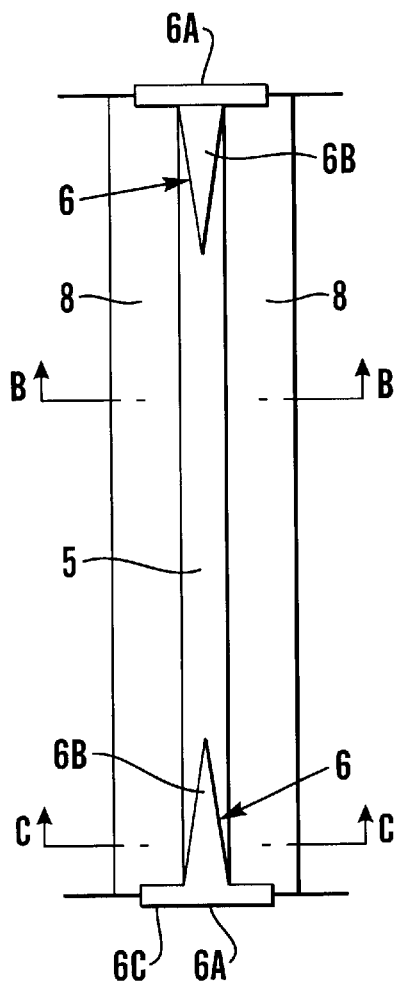
FIG. 2A is a plan view of an integrated optical waveguide having wedge-shaped tapers at each end.

FIG. 2A is a plan view of a rib waveguide 5 formed in the silicon layer of an SOI chip. The rib of such a waveguide typically has a height of around 1.5 microns (measured from the surface of the adjacent areas of silicon). Tapered structures 6 are provided at the ends of the waveguide between the rib waveguide 5 and the end faces 6A which are to be coupled with optical fibres (not shown) so the end faces 6A have a size more compatible with the size of the core of the optical fibre. Tapered structures 6 comprise a triangular-shaped upper portion 6B on top of the rib waveguide 5. Further details of such a tapered structure are given in WO98/35250 the disclosure of which is incorporated herein. The triangular portion 6B, as described in WO98/35250, typically has a thickness of about 5 microns so the overall thickness of the waveguide from the insulating layer 3 to the upper surface of the triangular portion 68, is around 10 microns. However, as indicated above, a need arises in some cases for this thickness to be increased to 13 microns or more in which case the thickness of the triangular portion needs to be 8 microns or more.

Figure 2B:
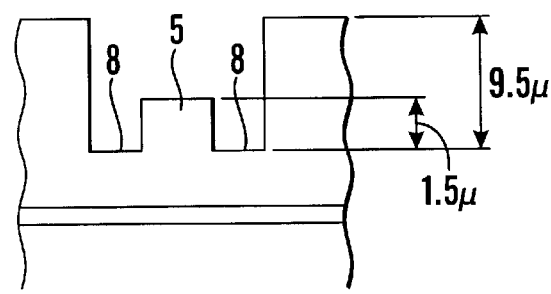
FIGS. 2B and 2C are cross-sectional views across the waveguide at lines B—B and C—C of FIG. 2A.
Figure 2C:
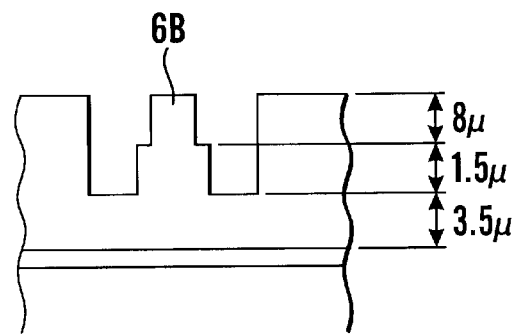

FIG. 2B is a cross-section along line B—B of FIG. 2A and shows a section through a portion of the rib waveguide 5. FIG. 2C is a cross-section along line C—C of FIG. 2A and shows a section through a triangular portion 6B part way along its length.

Figure 3:
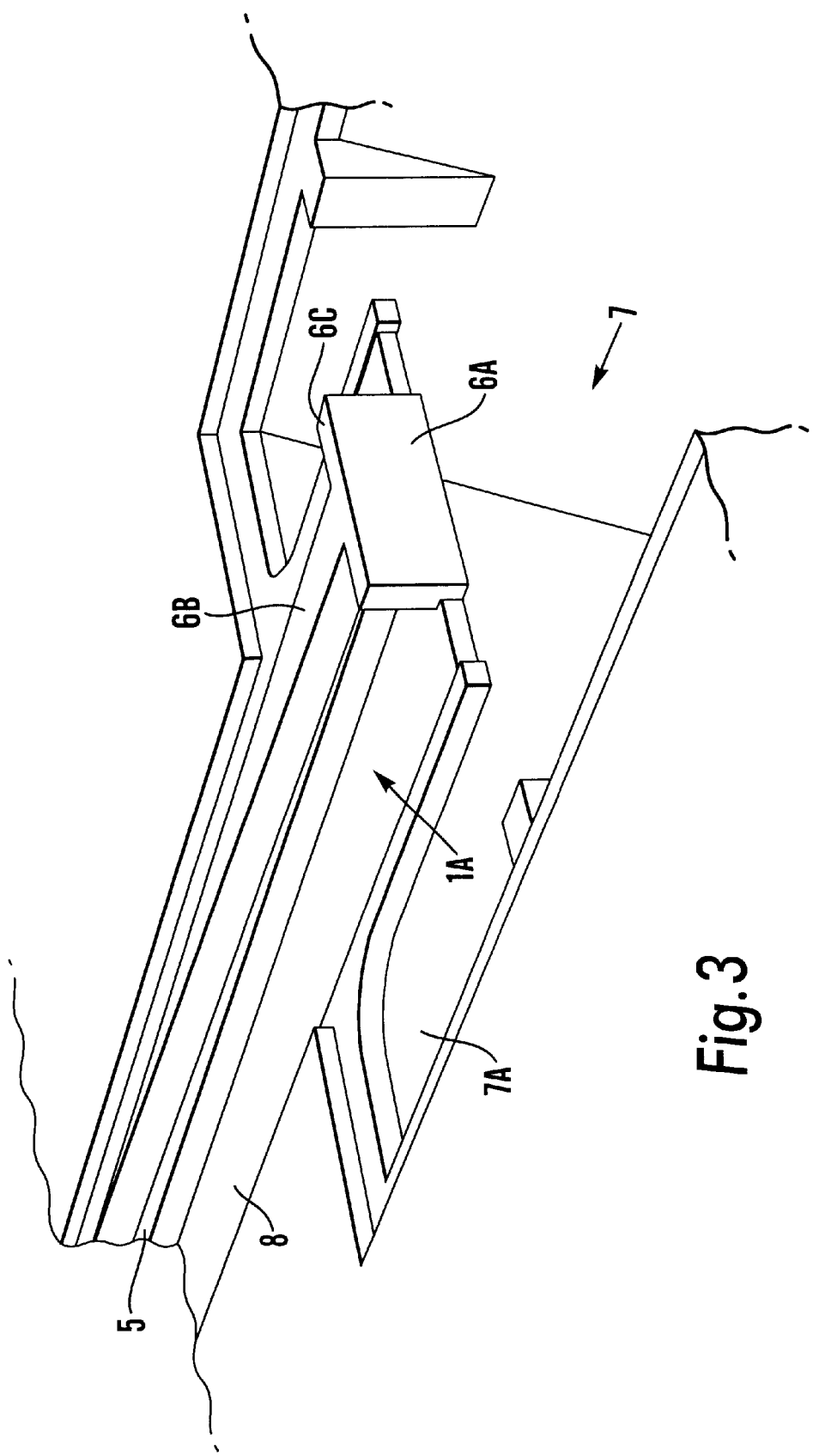
FIG. 3 is a perspective view of one end of a waveguide such as that shown in FIG. 2A.

FIG. 3 shows a perspective view of a tapered structure 6 at one end of a waveguide 5 as shown in FIG. 2A. The end face 6A of the waveguide is also provided with a widened portion 6C, known as a "T-bar", as disclosed in GB2334789A. The end of the waveguide 5 and the tapered structure 6 are also formed on a portion 1A of the silicon layer which overhangs the inclined end face 7A of a V-groove 7 for receiving an optical fibre (not shown). The use of such an overhang for coupling an integrated waveguide to an optical fibre is described in WO97/42534.

FIGS. 4A, 4B 4C and 4D illustrate steps involved in fabricating an integrated optical component such as that described in relation to FIGS. 2 and 3. It will be appreciated that the waveguide structure shown in these figures comprises a first set of features at a first level in the silicon layer 1, i.e. the rib 5 and recess 8 on either side thereof, these features being formed in a level of the silicon layer 1 up to 5 microns from the insulating layer 3, and a second set of features at a second level in the silicon layer 1, i.e. the triangular portion 6B a level of the silicon layer between 5 and 13 microns from the insulating laser.

Figure 4A:
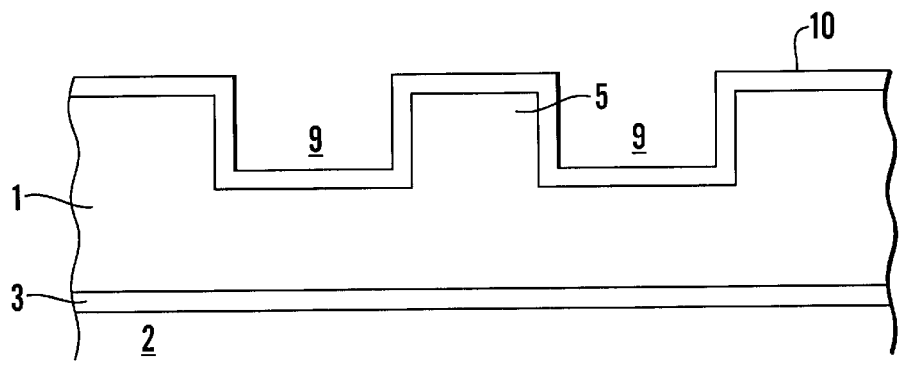
FIGS. 4A, 4B 4C and 4D illustrate a method according to the present invention for the fabrication of features of a component such as those shown in FIG. 2C.

To avoid the problems associated with fabricating such features in a silicon layer having a thickness greater than 10 microns, an SOI chip having a silicon layer of sufficient thickness to form the first set of features, i.e. the rib waveguide 5, is initially selected. The silicon layer preferably has a thickness of 10 microns or less and, most preferably, of 5 microns. A rib waveguide is fabricated in this silicon layer by etching the recesses 9 on either side thereof by known lithographic processes resulting in a structure as shown in FIG. 4A. This figure also shows an oxide layer 10 covering the rib waveguide 5, the recesses 9 and the adjacent silicon layer 1. Such a structure can be formed with great accuracy as it is a relatively planar structure, as variations in the thickness of the silicon layer 1 are small, as the thickness of the layer 1 is small (e.g. around 5 microns), and because the recesses 9 to be etched are relatively shallow, e.g. around 1.5 microns. Recesses of such depth can typically be formed to an accuracy of ±1.5%.

Figure 4B:
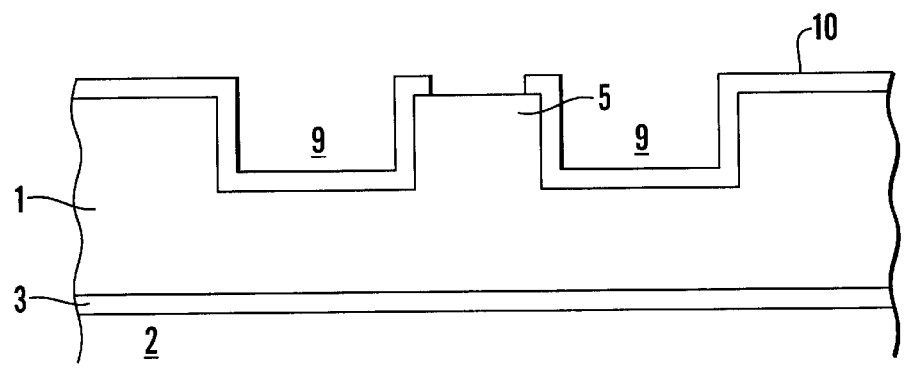

The oxide layer on the upper surface of the rib waveguide 5 in the region where the second set of features, i.e. the triangular portion 6B, are to be formed is then removed as shown in FIG. 4B, e.g. by etching.

Figure 4C:
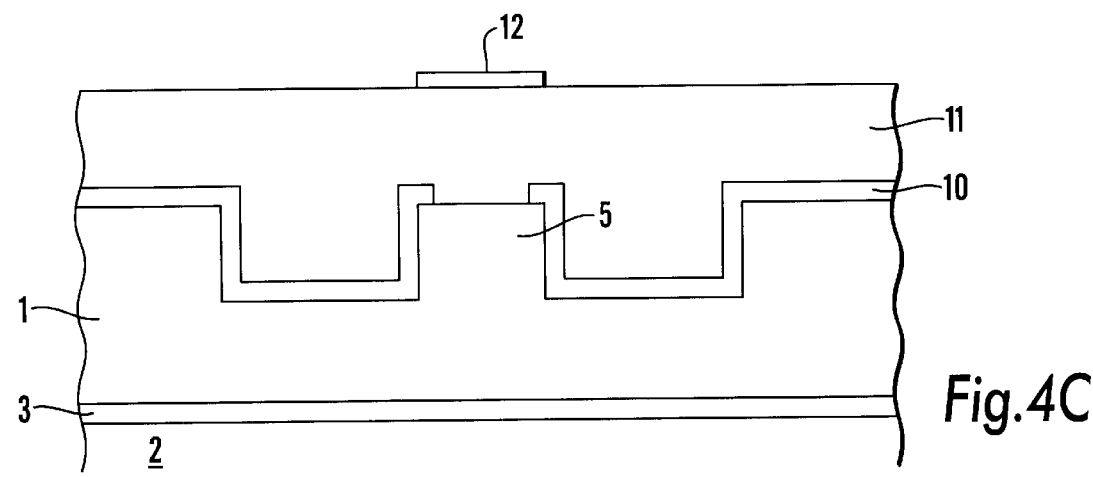

The thickness of the silicon layer over the exposed areas of the initial silicon layer is then increased, e.g. by epitaxial growth, to produce the structure shown in FIG. 4C. This growth may be selective or non-selective, or a combination. Selective growth meaning that single crystal Si grows on exposed Si surfaces only, whilst no growth takes place on exposed oxide layers. In non-selective growth, single crystal Si grows on exposed Si surfaces and polycrystalline Si grows on exposed oxide surfaces. For selective growth, HCl can be added to the gas mixture.

As shown in FIG. 4C, the structure formed has a relatively flat top surface suitable for receiving photollthographic masks. The thickness of the silicon layer is preferably increased by at least 5 microns and most preferably by at least 8 microns. In some cases, it may be desirable to grow the layer thicker than necessary and then polish the top of the layer by chemical/mechanical polishing (CMP) to achieve a flat surface.

Figure 4D:
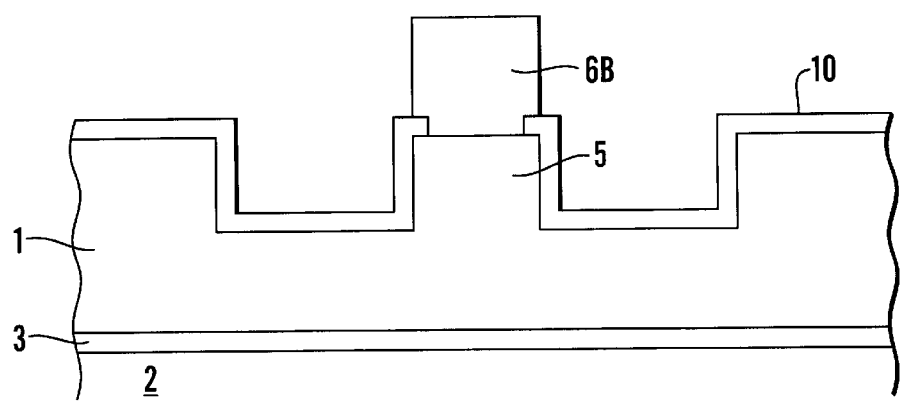

A high resolution photo-resist 12 is then deposited over the areas of the silicon layer 11 which are to remain (as shown in FIG. 4C) and the remaining areas of the layer 11 are etched away to leave the structure shown in FIG. 4D. The second set of features, i.e. the shape of the triangular portion 6B, are thus formed in the second level of silicon provided on top of the first level of silicon and formation of this second set of features does not disturb the first set of features, i.e. the rib waveguide 56 etc., formed in the first level of the silicon layer 1.

In an alternative arrangement, the shape of the triangular portion 6B may be defined by a triangular trench etched around the portion 6B. The silicon layer formed over the oxide layer over the remainder of the chip does not then need to be removed. This is illustrated more fully in FIG. 7.

The problems discussed above are thus avoided by fabricating the silicon layer in two stages and by fabricating features in the first level of the silicon layer before the second level of the silicon layer is formed. This two-stage method thus enables components having a relatively large thickness, e.g of 10 microns or more, measured from the insulating layer 3, to be fabricated with greater accuracy and greater consistency, so increasing the yield in the mass production of such components.

In an alternative form of the method described above, the silicon layer 11 may be formed by depositing amorphous polycrystalline silicon over the structure shown in FIG. 4B. The unwanted areas of the layer 11 can then be etched away in the manner described above. The resulting structure may then need to be heated to around 1100° C. to re-crystallize the silicon in the remaining areas of the layer 11. The re-crystallized area tends to grow from the boundary with the lower silicon level so helping to reduce defects in the boundary between the two levels.

When silicon is deposited by selective epitaxial growth, as described above, it forms a single crystal over the exposed area of the silicon layer 1 on the top surface of the rib waveguide 5 without the need for heat treatment.

Figure 5:
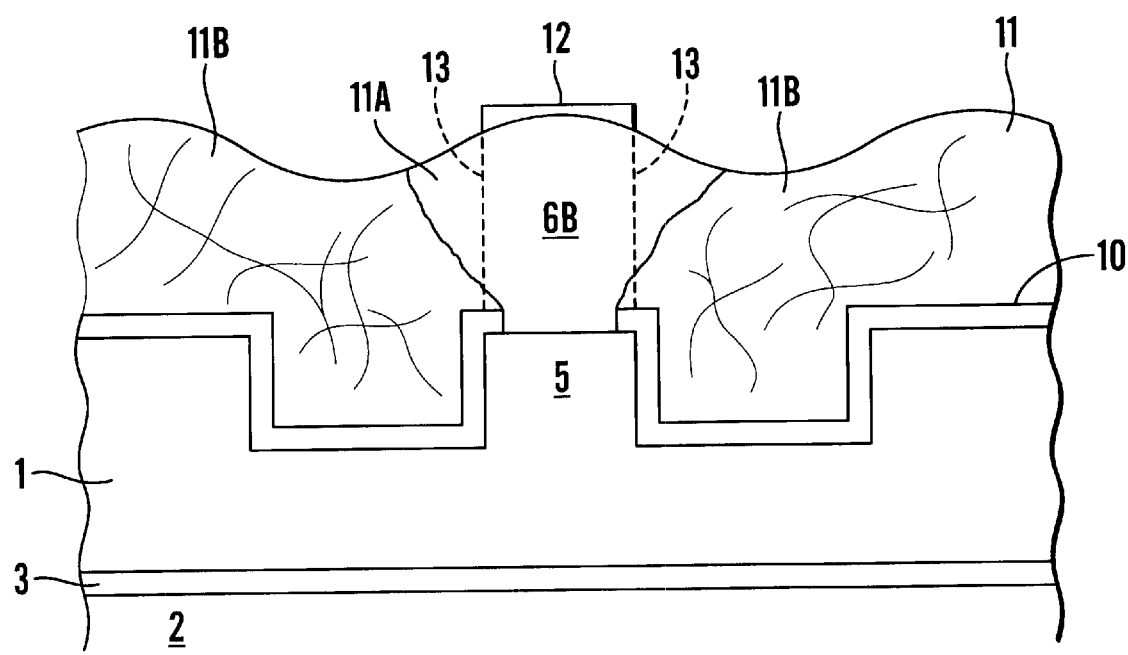
FIG. 5 corresponds to FIG. 4C and illustrates the crystalline structure of the silicon layer as its thickness is increased.

FIG. 5 shows the crystalline structure of the silicon grown or deposited to increase the thickness of the silicon layer. A single crystal area 11A forms over the exposed area of the lower level of silicon, either by epitaxial growth therefrom or when the amorphous silicon is heated. The remainder of the silicon deposited or grown over the oxide layer tends to be polycrystalline as shown in the areas 11B but his is etched away as described above in relation to FIGS. 4C and 4D. The dashed lines 13 in FIG. 5 indicate the boundaries between the silicon to be etched away and that which remains to form the triangular portion 6B.

Figure 6:
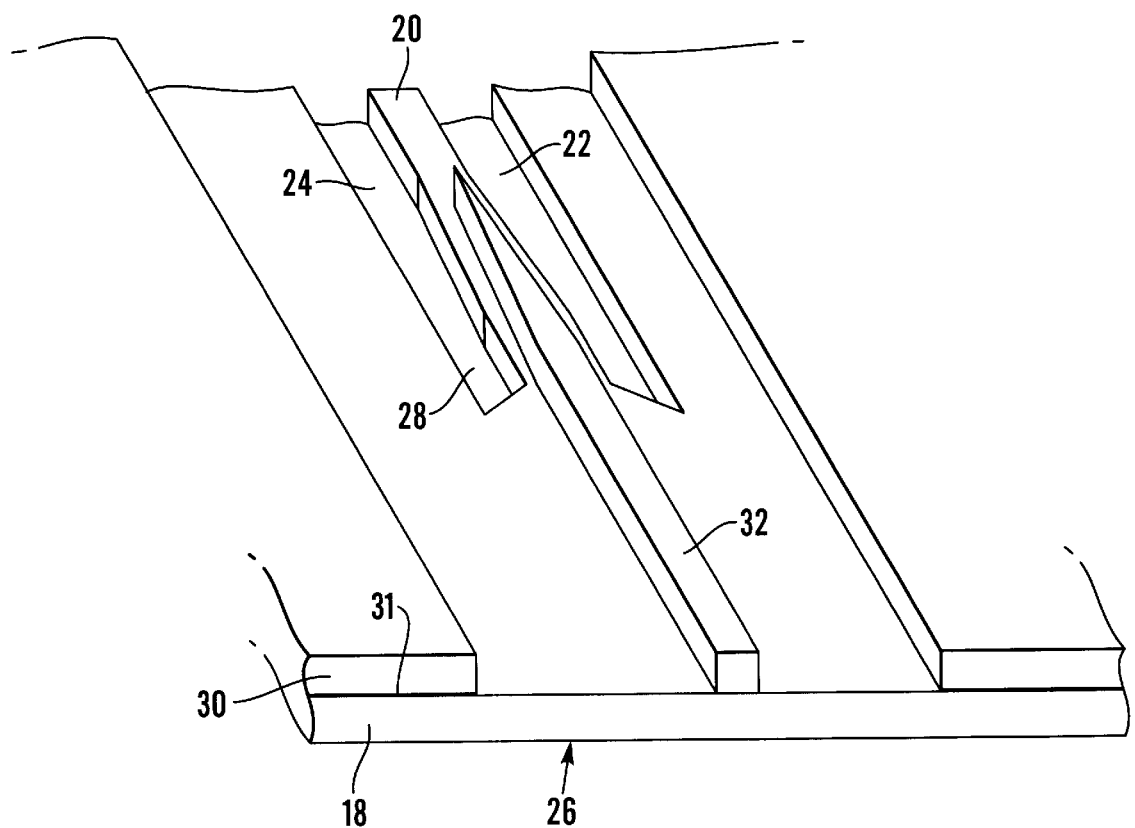
FIG. 6 is a perspective view of one end of another waveguide.

FIG. 6 shows an end of a waveguide according to the present invention. In a first silicon layer 18, a first waveguide element 20 is defined by trenches 22, 24 on either side. It extends towards the edge 26 of the wafer but terminates before the end at 28 where the trenches end. The trenches narrow slightly prior to ending and thus the width of the waveguide increases slightly.

In a second layer of silicon 30, separated where necessary from the first by an intervening oxide layer 31, a short second waveguide element 32 extends from the widening section of the first waveguide element 20 to the edge 26 of the wafer. The tip of the second waveguide element 32 over the widening section of the first ends with progressively narrowing width down to a taper.

Light propagating in the first waveguide element 20 is coupled into the second waveguide element 32 by the widening of the first element 20 and the development of the second element 32 from its taper point. The light is thus brought up into the second waveguide element 32 which can be of a larger dimension more suited to coupling to devices external to the wafer such as optical fibres. The process can also operate in reverse to couple light into a waveguide on the wafer.

Figure 7:
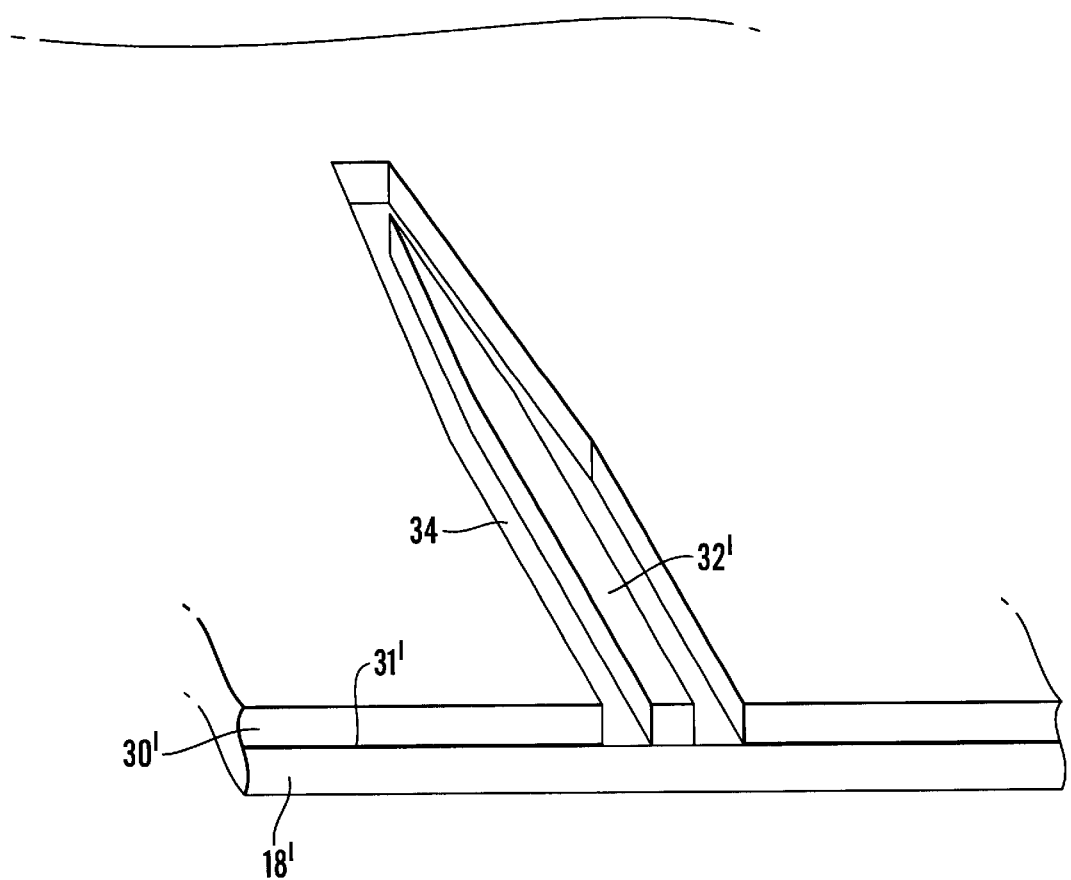
FIG. 7 is a perspective view of one end of a still further waveguide.

FIG. 7 shows a variant on the arrangement of FIG. 6. A generally similar structure is formed in the first silicon layer 18'. However, a lesser amount of silicon is removed from the second layer 30', the second waveguide element 32' being defined instead by a V-plan trench 34 around its perimeter.

A similar two-stage process may be used to fabricate other integrated components on a silicon-on-insulator chip, particularly components having a first set of features, e.g. a rib waveguide, at a first level in the silicon layer, e.g. up to 5 microns from the insulating layer, and a second set of features at a second level in the silicon layer where the second layer has a thickness of 5 microns or more or even 8 microns or more.

The process may also be extended to three or more stages, e.g. in which three or more levels of silicon are formed at different stages and features are formed in each layer before the subsequent layer is formed. WO98/35250 describes a three level tapered structure which could be formed by such a three-stage process.

What is claimed is:

1. A method of fabricating an integrated optical component on a silicon-on insulator chip comprising a crystalline silicon layer separated from a substrate by an insulating layer, the component having a first set of features at a first level in the crystalline silicon layer adjacent the insulating layer and a second set of features at a second level in the crystalline silicon layer further from the insulating layer, the method comprising the steps of:

selecting a silicon-on-insulator chip having a crystalline silicon layer of sufficient thickness for the first set of features;

fabricating the first set of features in the crystalline silicon layer so as to form said first set of features at a first level in the crystalline silicon layer;

increasing the thickness of the crystalline silicon layer in selected areas by forming a second level of the crystalline silicon layer directly on at least part of an exposed surface of the crystalline silicon layer of the first level; and fabricating the second set of features at the second level in the crystalline silicon layer.

2. A method as claimed in claim 1 comprising the step of selecting a silicon-on-insulator chip having a crystalline silicon layer with a thickness of 10 microns or less.

3. A method as claimed in claim 1 in which the thickness of the crystalline silicon layer is increased by at least 5 microns.

4. A method as claimed in claim 1 in which the first set of features is fabricated by photolithography.

5. A method as claimed in claim 1 in which the second set of features is fabricated by photolithography.

6. A method as claimed in claim 1 in which the thickness of the crystalline silicon layer is increased by epitaxial growth.

7. A method as claimed in claim 1 in which the thickness of the crystalline silicon layer is increased by deposition of polycrystalline silicon.

8. A method as claimed in claim 7 in which, after deposition, the polycrystalline silicon is heated so that it re-crystallises at least in the selected areas.

9. A method as claimed in claim 1 in which the first set of features are defined to an accuracy of ±5%.

10. A method as claimed in claim 1 in which the first set of features define a rib waveguide.

11. A method as claimed in claim 10 in which the second set of features define a structure on top of the rib waveguide.

12. A method as claimed in claim 11 in which the structure comprises a triangular shaped portion which, with the underlying rib waveguide, forms a tapered rib waveguide for use in providing an optical coupling between the rib waveguide and an optical fibre.

13. A method as claimed in claim 1 comprising the step of selecting a silicon-on-insulator chip having a crystalline silicon layer with a thickness of 5 microns or less.

14. A method as claimed in claim 1 in which the thickness of the crystalline silicon layer is increased by at least 8 microns.

15. A method as claimed in claim 1 in which the first set of features are defined to an accuracy of ±1.5%.

* * * * *